April 12, 1938. G. O. CONNER 2,114,137

CONTAINER AND MANUFACTURE THEREOF

Filed Oct. 16, 1934 4 Sheets-Sheet 2

INVENTOR
George O. Conner
by Byrnes, Stebbins & Parmelee
his attorneys

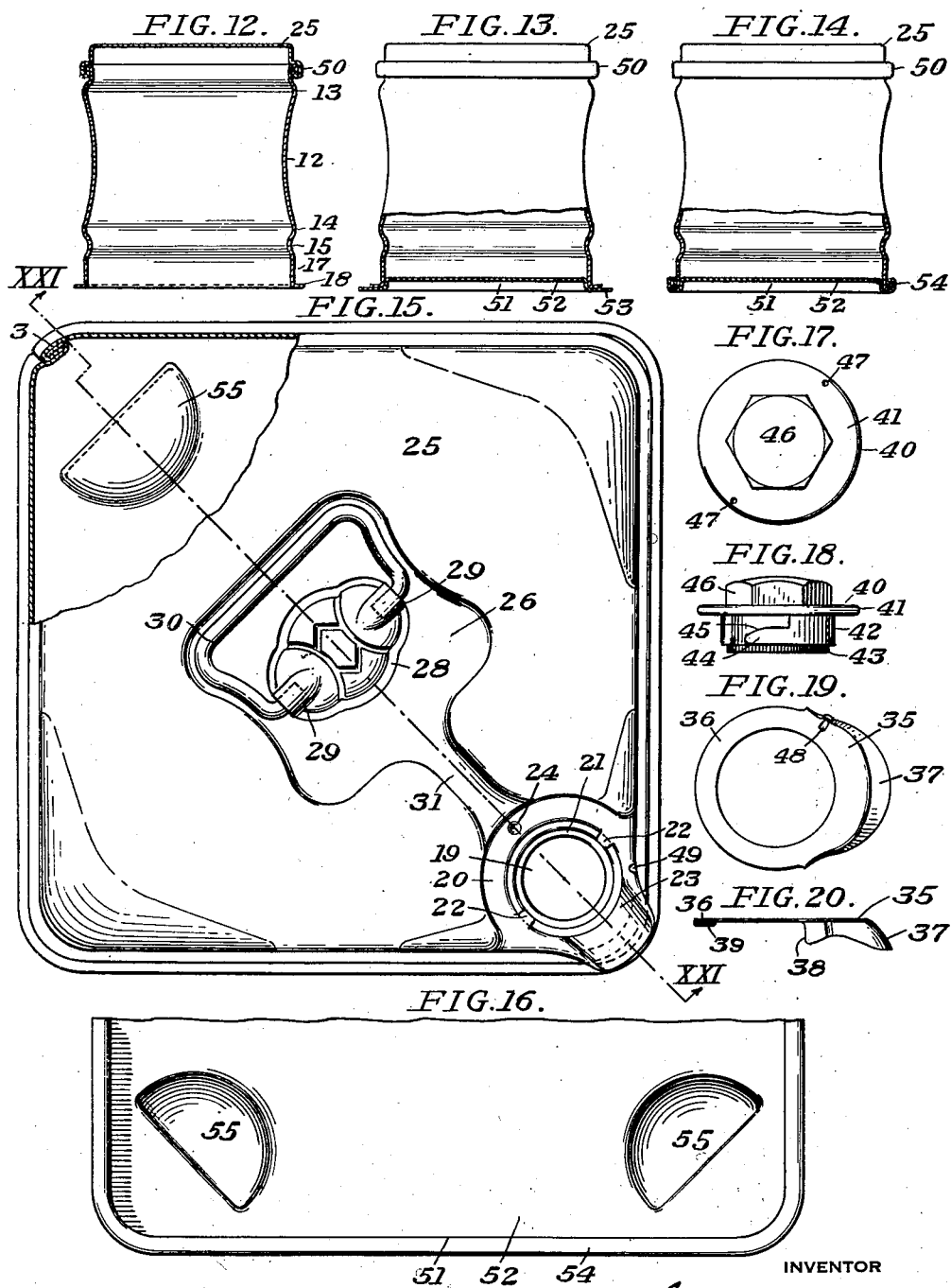

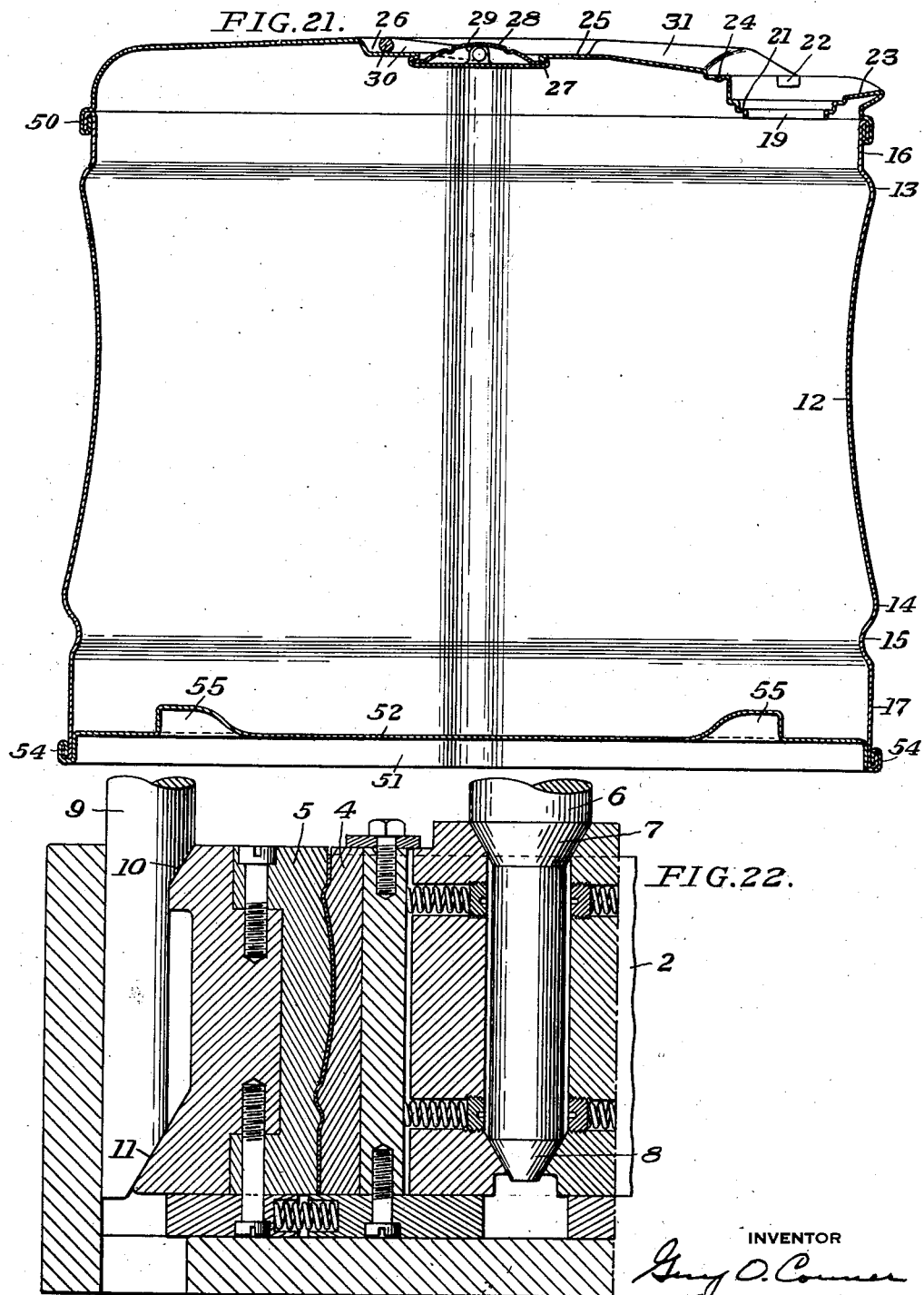

Patented Apr. 12, 1938

2,114,137

UNITED STATES PATENT OFFICE 2,114,137

CONTAINER AND MANUFACTURE THEREOF

Guy O. Conner, Wheeling, W. Va., assignor to Wheeling Steel Corporation, Wheeling, W. Va., a corporation of Delaware Application October 16, 1934, Serial No. 748,469

5 Claims. (Cl. 220—1)

This invention relates broadly to containers and the manufacture thereof. It relates more particularly to the manufacture of drawn sheet metal containers, and especially containers of the type adapted for the storage and transportation and dispensing of fluids. The invention further relates to certain improved steps in the manufacture of sheet metal containers resulting in the formation with high economy both as to cost of manufacture and as to the amount of material used of a container of exceptional strength and utility and having the added feature of greatly enhanced appearance with respect to containers heretofore used for similar purposes.

The invention still further relates to certain detailed features of construction of containers of the type referred to whereby distinct advantages and increased utility are obtained. A novel spout and closure arrangement is provided, there being means for protecting the spout against damage and keeping it clean when not in use; and means are also provided for assisting in handling the container with great ease and reducing to a minimum the danger that the container will slip when being handled or when its contents are being poured. Certain features of the invention herein disclosed but not claimed are disclosed and claimed in my copending application Serial No. 14,463, filed April 3, 1935, which application is a division of this application, and in my copending application Serial No. 111,897, filed November 20, 1936, which application is a division of said application Serial No. 14,463.

By a novel method of manufacture I am enabled to form a container of given capacity out of a reduced amount of material and to actually impart to such container a greater strength than that of containers heretofore available for similar purposes made out of a considerably greater weight of material. I preferably form the body of the container by drawing, this being done in such a way as to increase the capacity of the container while at the same time adding strength so that the container will better withstand rough usage and will also withstand relatively high internal pressures, such as pressures caused by vapors emanated by liquids contained in the container. Strengthened closure means are also provided and the present preferred form of container as shown in the drawings is of radically new design and construction throughout having all of the advantages above pointed out. The container is of greatly enhanced appearance and for that reason, in addition to its various structural advantages, it is superior in utility to containers heretofore available for similar purposes as it may be left in view without creating a sloppy appearance.

No attempt is here made to explain all of the details, objects and advantages of the invention. Other details, objects and advantages will become apparent as the following description of a present preferred embodiment of the invention and a present preferred method of carrying it out proceeds.

In the accompanying drawings I have shown a present preferred embodiment of the invention and have diagrammatically illustrated certain steps in the manufacture of containers, in which Figure 1 is a perspective view of a container;

Figure 12 is a central vertical cross-sectional view showing the top closure double seamed to the body blank;

Figure 13 is an elevational view, partly in central vertical cross section, showing a bottom closure in place at the bottom of the body blank;

Figure 14 is an elevational view, partly in central vertical cross section, showing the bottom closure seamed to the body blank;

Figure 15 is a top plan view of the container, to enlarged scale and with a portion cut away and with the spout cover and closure cap removed;

Figure 16 is a fragmentary bottom plan view showing a portion of the bottom of the container;

Figure 17 is a top plan view of the closure cap;

Figure 18 is an elevational view of the closure cap;

Figure 19 is a top plan view of the spout cover;

Figure 20 is a central vertical cross-sectional view through the spout cover;

Figure 21 is a central vertical cross-sectional view taken on the line XXI—XXI of Figure 15; and Figure 22 is a partial cross-sectional view through drawing mechanism adapted for use in manufacture of the body blank.

Figure 2:
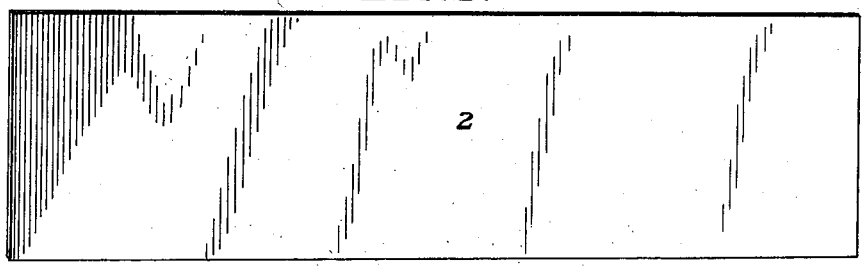
Figure 2 is a plan view of a sheet metal blank.
Figure 3:
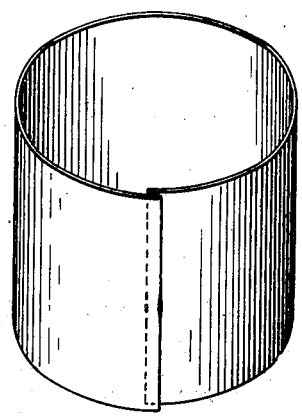
Figure 3 is a perspective view of the blank formed into generally cylindrical shape.
Figure 4:
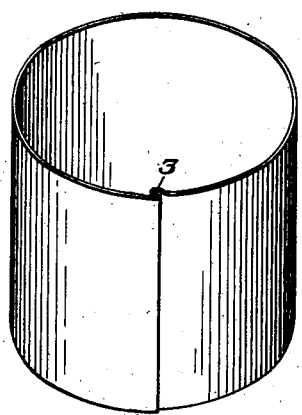
Figure 4 is a perspective view of the blank with the edges seamed together.

Referring now more particularly to the drawings, the invention will be described as embodied in the manufacture of a sheet metal container of small or medium size, such, for example, as a five-gallon can. There is provided a blank 2 (Figure 2) of sheet metal, which blank in the preferred embodiment takes the shape of an elongated rectangle as shown. The blank is first bent into generally cylindrical shape as shown in Figure 3 and the edges thereof are seamed together as shown at 3 in Figure 4. This forms a peripherally closed blank adapted for formation of the body or side wall structure of the container. Although the seam shown at 3 in Figure 4 is a folded or crimped seam, the edges of the blank may be seamed or joined together otherwise, as, for example, by welding.

Figure 5:
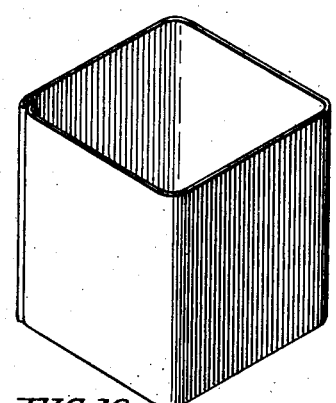
Figure 5 is a perspective view of the blank formed of generally square cross section.

The peripherally closed blank is next shaped to generally rectangular cross section as shown in Figure 5 and with the seam at one corner. It is preferred to position the seam at a corner of the blank in order that all four sides of the container may be smooth and thus readily adapted for lithographing or for the attachment of labels. However, an advantage may also be obtained by positioning the seam at the center of a side of the container, as when the seam is so positioned the drawing operation subsequently to be described is facilitated.

The shaping of the peripherally closed blank to generally rectangular cross section mentioned in the preceding paragraph is not a drawing operation as ordinarily understood in the art, the metal at the corners being deformed only sufficiently to enable the blank to retain or approximately retain the desired shape so as to be more readily adapted to be positioned in a drawing die for the subsequent operation. The corners of the blank are not perfectly square but are conveniently rounded as shown, the blank being adapted to be positioned in a drawing die of well known construction, such, for example, as indicated in Figure 22, the general structure and operation of this die being similar to those of the ribbing die disclosed in Kielberg Patent No. 1,935,848.

The die consists of four segmental internal die parts 4 and four segmental cooperating external die parts 5, as well known in the art, the internal die parts being moved outwardly by downward movement of a plunger 6 having inclined faces 7 and 8 cooperating, respectively, with inclined portions of the mechanism cooperating with the internal die parts. The external die parts are operated, respectively, by plungers 9 having inclined surfaces 10 and 11 and functioning similarly to the plunger 6. As the die construction is well known it need not be described in detail.

A pair of cooperating internal and external die parts acts on each corner portion of the blank shown in Figure 4 from the corner to approximately the mid-point of each adjacent side where the die parts acting on the next corner substantially meet those acting on the first mentioned corner. All five of the die operating plungers (one central plunger for operating the internal die parts and four corner plungers for operating the external die parts) are actuated either simultaneously or in rapid predetermined succession so that all four internal die parts move outwardly and all external die parts move inwardly to the desired extent at a predetermined point. Thus at one time the entire surface of the blank, both internal and external, is compressed and drawn by the die parts, this enabling deformation of the metal of the blank as a whole in predetermined controlled manner.

Figure 6:
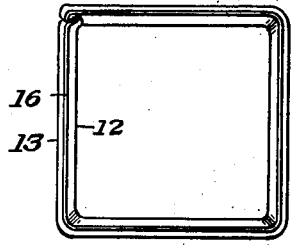
Figures 6 and 7 are, respectively, a top plan view and a central vertical cross-sectional view through the blank after having been subjected to a drawing step.
Figure 8:
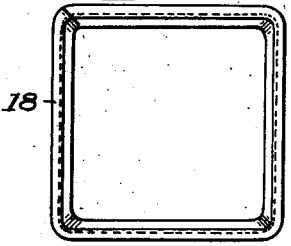
Figures 8 and 9 are, respectively, a top plan view and a central vertical cross-sectional view of the blank following a further operation.
Figure 7:
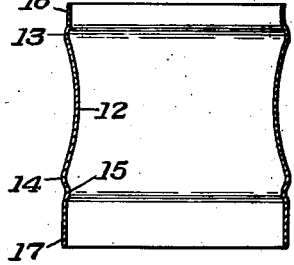

In the drawing operation the sides of the blank are formed of inwardly bowed contour throughout a large fraction of the vertical extent thereof. The blank after the drawing operation is shown in Figures 6 and 7. The smallest perimeter of the blank is at the point 12 in the region of the mid-point of the height of the blank. The perimeter at this point may be substantially the same as the perimeter of the blank before the drawing operation, that is to say, the metal at the point 12 is not substantially drawn or thinned but retains substantially its original thickness and, consequently, its original strength. Above and below this point, however, the metal is drawn outwardly to form the bowed side wall structure, the outwardly drawn metal being, of course, reduced in thickness as it is stretched during the drawing operation. The inwardly bowed structure formed in the sides of the blank adds very materially to its strength and rigidity as well as providing for withstanding relatively great internal pressures. Immediately above and below the bowed portion of the blank are outwardly formed rib-like portions 13 and 14, respectively, and immediately below the portion 14 is an inwardly formed rib-like portion 15, these portions serving in cooperation with the bowed portion to impart to the blank very exceptional strength and rigidity. Upper and lower drawn portions 16 and 17, respectively, of substantially uniform perimeter are provided above the portion 13 and below the portion 15, respectively. The portion 17 is of materially greater perimeter than the portion 16 and both, of course, are of very materially greater perimeter than the portion 12. The portions 16 and 17 are made of substantially constant perimeter to facilitate seaming thereto of the top and bottom closures, respectively, as will presently appear.

The drawing operation above described not only results in a body blank of very greatly increased strength and rigidity but also increases to quite a material extent the capacity of the blank relatively to its capacity when in the undrawn form, as in Figure 5. The metal is thinned out above and below the point 12 (Figure 7), but this thinning out occurs gradually in both directions away from the point 12 and in such relationship with the portions 13, 14, and 15 as actually to impart to the blank greater strength than when in the undrawn form of Figure 5. The result is a remarkable economy in metal, as the capacity for a given weight of metal is increased and the strength of the structure is likewise increased at the same time despite the fact that the metal is stretched to provide for the increased capacity.

The rounded corners of the blank also lend it further added strength. These corners intersect and cooperate with the portions 12 to 17, inclusive, to brace and strengthen the blank both vertically and peripherally. The vertical seam 3, being positioned at a corner of the blank, also lends added strength, and I prefer to position such seam at the corner opposite the corner at which the spout will be positioned so as to sustain the stresses incident to handling and lifting the container in forming. However, the vertical seam 3 may be positioned at the spout corner or at one of the lateral corners.

Figure 9:
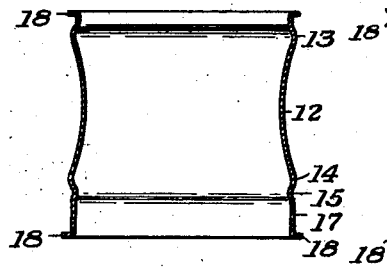

The drawn body blank is next prepared for assembly with the top and bottom closures. These closures are also preferably of sheet metal and are preferably permanently connected therewith by seaming, although the top closure may be made removable as a whole if desired. If both top and bottom closures are to be seamed to the body blank, feet 18 are outwardly turned from the portions 16 and 17 of the body blank in order to provide for seaming the closures thereto, as shown in Fig. 9. This is an ordinary operation which may be performed in well known manner. If the top closure is to be made removable as a whole the top rim of the body blank is preferably provided with a wire bead, as well known in the art.

Figure 1:
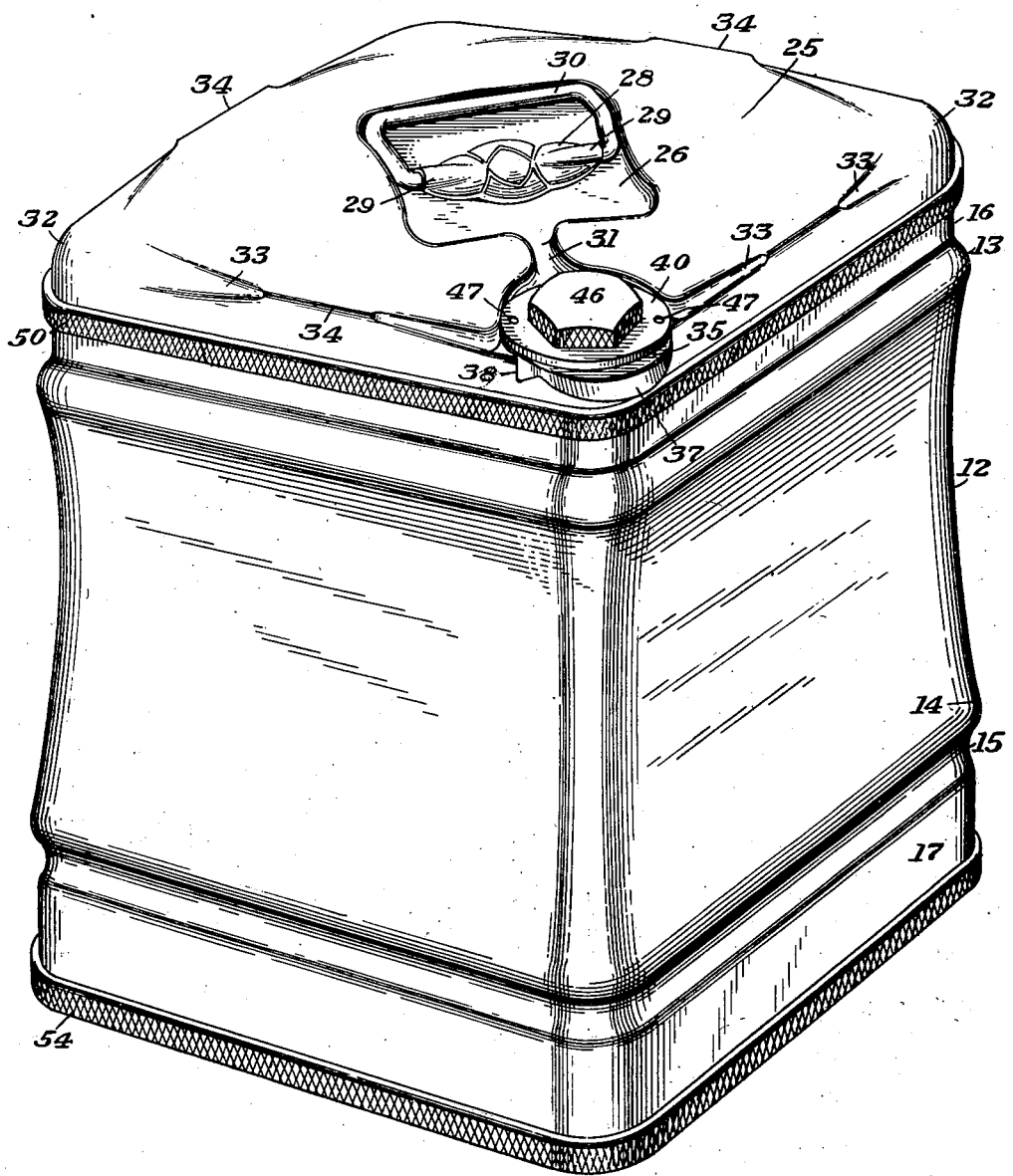
Figure 10:
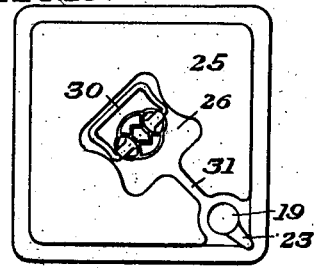
Figures 10 and 11 are, respectively, a top plan view and a central vertical cross-sectional view of the body blank having a top closure set in place thereon ready for double seaming.

The top closure is indicated in Figure 10 as it appears before being seamed to the body blank, and in Figures 1, 15, and 21 after having been seamed thereto. This closure is preferably drawn into generally dome shape with rounded corners as shown so as to fit and cooperate with the drawn body blank. The top closure has a pouring opening 19 surrounded by a rim 20, being let into the top below the upper surface thereof, as shown in Figures 1 and 21. Within the pouring opening 19 is a sunken sealing portion 21, and extending inwardly toward the axis of the pouring opening from opposite sides thereof at or just below the level of the rim 20 is a pair of projections 22 for a purpose to be presently described. A spout 23 is drawn into the top as shown in Figures 15 and 21 and forms a smooth continuation of the rim 20. Such rim has an embossed portion 24 adapted to be punctured to provide a vent to assist in pouring out the contents of the container. The spout structure, although preferably forming an integral drawn part of the top closure, may be otherwise connected with such closure, as, for example, by seaming or welding.

The top surface of the container is indicated at 25 and there is provided therein a downwardly drawn depression 26 within which is crimped at 27 a trunnion member 28 having trunnions 29 formed therein. A handle 30 is pivoted to the trunnions 29 as shown and is adapted to be lifted up to enable the fingers of the hand to be passed therethrough to enable the container to be carried. When in its lower or inoperative position the handle lies substantially entirely within the confines of the depression 26. The axis of the trunnions 29 may be substantially along the transverse diagonal of the top so that the handle extends substantially at right angles to the diagonal through the spout, thus enabling the container to be held in a natural position when pouring out its contents through the spout. A drawn connecting portion 31 connects the depression 26 with the depression in which the pouring opening and spout are situated, this preventing the accumulation of liquid in the depression 26 and consequent submerging of the handle.

The corners of the top are rounded both horizontally and vertically as shown at 32, the material being drawn therefrom to provide ornamental portions 33, which also serve to strengthen the top, the top intermediate the corners having upwardly and outwardly facing shoulders 34 adapted to insure proper positioning thereon of another similar container stacked on top of the container. As the handle 30 is let down within the confines of the top and the top of the cap for closing the pouring opening does not extend substantially above the surface 25, the container is ideally suited for stacking, as will presently be described.

The spout 23 extends outwardly over the corner of the container so as to provide for pouring out the contents of the container therethrough, as shown in Figures 15 and 21. A spout cover 35 (Figures 19 and 20) is provided for covering the spout 23 when not in use and keeping it clean. The spout cover 35 comprises a flat annular portion 36 adapted to lie on the rim 20 and a forwardly and downwardly extending curved portion 37 to cover and protect the lip of the spout. The portion 37 terminates rearwardly on each side in a shoulder 38, these shoulders assisting in positioning the spout cover in place. Connected with the under side of the portion 36 of the spout cover is a gasket 39 adapted to lie on and seal the vent 24 after such vent has been opened and the container has later been closed. When the spout cover is in place it lies with the portion 36 on top of the rim 20 and with the portion 37 covering and closing the lip of the spout, the shoulders 38 lying outside the spout and assisting in positioning and maintaining the spout cover in place, as shown in Figure 1.

There is provided a closure cap 40 (Figures 17 and 18) which comprises a flat annular flange 41 adapted to overlie the portion 36 of the spout cover, which, in turn, overlies the rim 20 of the top of the container. Projecting downwardly centrally of the closure cap is a hub portion 42 to the bottom of which is connected a gasket 43. The gasket is adapted to seat on and cooperate with the sealing portion 21 so as to close and seal the pouring opening. At the outer surface of the hub 42 is a pair of oppositely disposed circumferentially extending cam lugs 44 adapted when the closure cap is set in place with respect to the pouring opening and rotated in the clockwise direction when viewed from above to pass beneath the projections 22 to press and maintain the closure cap tightly in place to effect a tight permanent seal between the gasket 43 and the sealing portion 21. The cam lugs 44 are forwardly tapered, as shown at 45, so that as the cap is turned a wedging engagement will be effected between the projections 22 and the lugs 44, thus insuring a tight seal. The cap has an upwardly extending hub 46 shaped to receive a wrench to turn the cap.

The closure cap 40 not only effects a tight seal at the pouring opening, but also maintains tightly in place the spout cover so as to protect the spout and keep it clean. The cap also presses the portion 36 of the spout cover against the rim 20 and particularly presses the gasket 39 down over the vent 24 to seal the vent as well as the pouring opening. A pair of oppositely disposed holes 47 is provided in the flange 41 of the cap 40 and a hole 48 is provided in the spout cover and a recess 49 is provided in the side of the exterior of the spout, as shown in Figure 15. When the spout cover is in place and the closure cap is applied and turned down to seal the pouring opening one of the holes 47 in the flange 41 of the closure cap is in alignment with the hole 48 in the spout cover, which, in turn, is in alignment with the recess 49 so that a sealing wire may be passed through the holes 47 and 48 and within the recess 49 to hold the cap against turning movement relative to the spout cover. As the spout cover is prevented from turning by engagement of the shoulders 38 with the exterior of the spout, this prevents removal of the cap and maintains the container sealed until the sealing wire is broken and removed. Two holes 47 are provided at diametrically opposed portions of the closure cap, one in proper relationship with each of the oppositely disposed cam lugs 44, so that one or the other of the holes 47 will be in alignment with the hole 48 in the spout cover regardless of how the cap may be applied.

Figure 11:
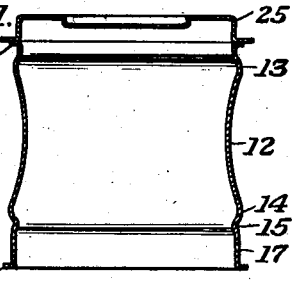

Reverting now to the assembly of the container, Figures 10 and 11 show how the drawn top closure is assembled with the drawn body blank preparatory to seaming the same together. In Figure 12 the top closure is shown as being seamed to the body blank at 50. As above mentioned, instead of seaming the top closure to the body blank the body blank may be provided with a suitable rim, as, for example, the usual wire bead, and a gasket may be provided adapted to be interposed between the wire bead and the sealing portion of the top closure, any suitable means of well known construction being provided for detachably connecting the top closure to the body blank.

In Figure 13 a bottom closure member 51 is shown in cooperative relationship with the bottom of the body blank, the bottom closure member 51 having a horizontally extending main portion 52 having at its periphery a downwardly and outwardly extending foot 53 adapted to receive the extremity of the body blank, as shown in Figure 13. The bottom closure member and body blank are shown as being seamed together at 54 in Figures 14 and 21. The bottom closure member is provided with drawn upward depressions 55, one at each corner, as shown in Figure 15, to assist in handling the container. In any event, it is preferable to have at least one of the depressions 55 at the bottom corner of the container opposite the corner at which the spout is situated to assist in holding the container in a natural position for pouring. One hand may grip the handle 30 and the fingers of the other hand may be inserted within the depression 55 at the corner opposite the spout, this providing a very natural and easy means for handling the container and pouring out its contents. The projections 55 also very materially strengthen the bottom and add rigidity to it.

As above mentioned, the horizontal dimensions of the body blank at the portion 17 are greater than at the portion 16. This enables stacking of the containers one upon another as the bottom seam 54 fits down over the top of a similar container and snugly embraces the shoulders 34 at the top of such similar container so that the containers are positively maintained in proper stacked relationship.

The completed container may be subjected to any suitable after-operations, such as painting, after which it is ready to be shipped out for use.

While I have shown and described a present preferred embodiment of the invention and certain present preferred methods or steps used in the manufacture of containers, it is to be distinctly understood that the invention is not so limited but may be otherwise variously embodied and practiced within the scope of the following claims.

I claim:

1. A sheet metal container of rectangular horizontal cross section comprising a body portion having generally flat sides and rounded corners and having the metal at the upper and lower parts thereof stretched to form sides and corners which are inwardly bowed at their middle portions and which have horizontally extending ribs at the upper and lower margins of the bowed middle portions, thereby to stiffen the container and increase its capacity, and a head and a bottom joined to the upper and lower edges respectively of the body portion.

2. A sheet metal container of rectangular horizontal cross section comprising a body portion having the metal at the upper and lower parts thereof stretched so as to form sides which are inwardly bowed vertically with horizontally extending ribs at the upper and lowerer margins of the bowed middle portions, thereby to stiffen the container and increase its capacity, and a head and a bottom joined to upper and lower edges respectively of the body portion.

3. A sheet metal container of rectangular horizontal cross section comprising a body portion having sides which are inwardly bowed vertically throughout their middle portions with horizontally extending stiffening ribs at the upper and lower margins of the middle portions and substantially flat marginal portions beyond the stiffening ribs, and having rounded corners which have bowed, ribbed and marginal portions corresponding to such portions of the sides, the flat lower marginal portion at the bottom having a greater perimeter than the flat upper marginal portion at the top so as to permit stacking of the containers, a head of substantially the same perimeter as the upper marginal portion joined thereto, and a bottom located within the lower marginal portion and above the lower edge thereof to provide a stacking recess to receive the head of another and similar container.

4. A polygonal sheet metal container of rectangular horizontal cross section comprising a body portion having sides which are inwardly bowed vertically at their middle portions with stiffening ribs at the upper and lower margins of the bowed middle portions and substantially flat upper and lower marginal portions beyond the stiffening ribs, and having rounded corners which have bowed, ribbed and marginal portions corresponding to such portions of the sides, and a head and a bottom joined to the upper and lower edges respectively of the body portion.

5. A polygonal sheet metal container of rectangular horizontal cross section comprising a body portion having sides which are inwardly bowed vertically throughout their middle and major portions and formed with horizontally extending stiffening ribs at the upper and lower margins of the bowed middle portions and having rounded corners which are bowed and ribbed corresponding to the sides, and a head and a bottom joined to the upper and lower edges respectively of the body portion.

GUY O. CONNER.